J. T. OHARRA.
Car-Coupling.
No. 211,177. Patented Jan. 7, 1879.
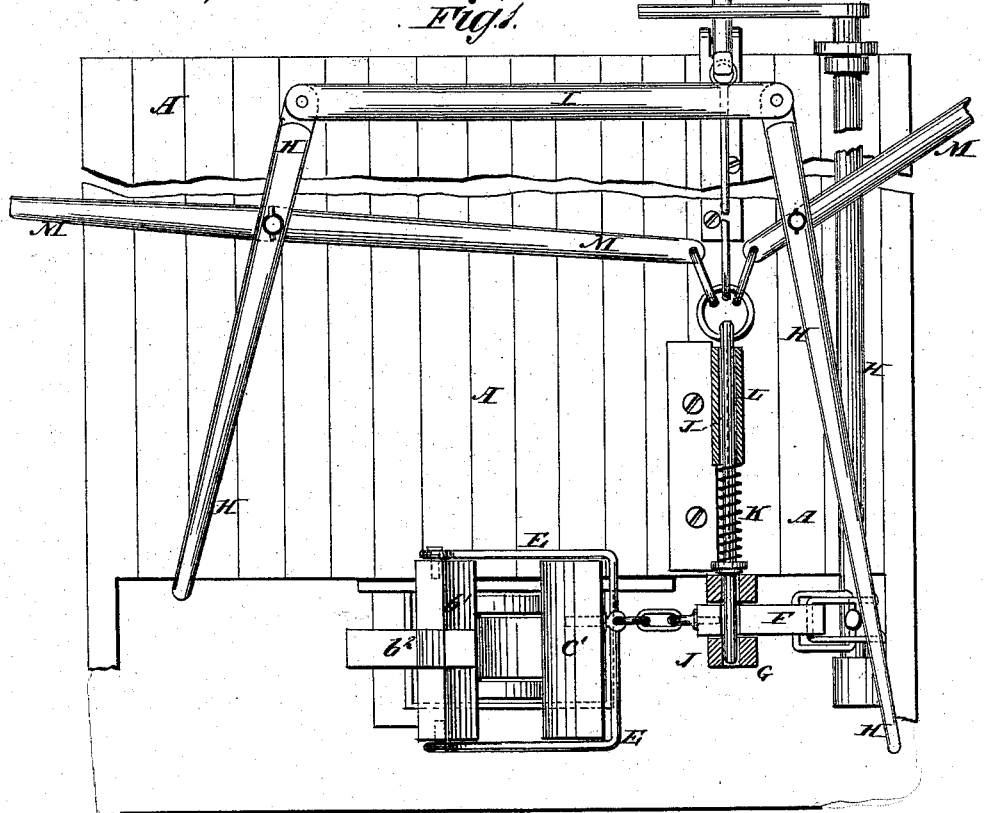
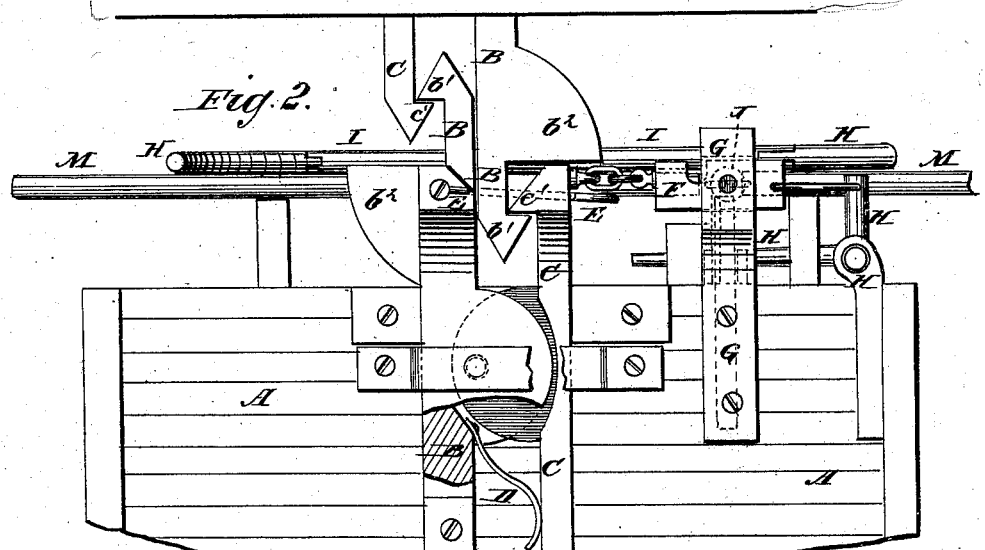
WITNESSES:
INVENTOR:
J. T. Oharra
BY
ATTORNEYS.

UNITED STATES PATENT OFFICE.

JOHN T. O'HARRA, OF DODGE CITY, KANSAS.

IMPROVEMENT IN CAR-COUPLINGS.

Specification forming part of Letters Patent No. 211,177, dated January 7, 1879; application filed November 18, 1878.

*To all whom it may concern:*

Be it known that I, JOHN TIMOTHY O'HARRA, of Dodge City, in the county of Ford and State of Kansas, have invented a new and useful Improvement in Car-Couplings, of which the following is a specification:

Figure 1 is a front view of the body of a freight-car to which my improved coupling has been applied. Fig. 2 is a bottom view of the forward part of the same.

Similar letters of reference indicate corresponding parts.

The object of this invention is to furnish an improved car-coupling which shall be so constructed that the cars will couple themselves when run together, which may be uncoupled when the cars are standing still, which may be operated from the top and sides or the platform of a car, and which shall be convenient, reliable, and safe in use.

The invention consists in the combination of the two hook-bars, pivoted to each other and provided with a spring, the sliding bar, one or more levers, the pin, and the spiral spring, with each other and the body of a car, and in the combination of the two hook-bars, pivoted to each other and provided with a spring, the sliding bar and its three levers, the pin, the spiral spring, and the three pin-levers, with each other and the body of a car, as hereinafter fully described.

A represents the car-body, to which is attached, in the usual way, the draw-bar B. The forward end of the bar B projects in front of the car, and is beveled upon its opposite sides. Upon the outer side of the forward end of the bar B is formed a shoulder or hook, $b^1$.

C is a bar, which is placed parallel with the bar B. Upon the inner sides of the bars B C are formed half-round projections, which are interlocked with and pivoted to each other. The rear ends of the bars B C are held apart, holding their forward ends together, by a spring, D, interposed between them. The forward end of the bar C is made shorter than the bar B, is beveled off upon its inner side, and has a shoulder or hook, $c'$, formed upon its inner side.

Upon the outer side of the long hook $b^1$ is formed a projecting shoulder, $b^2$, for the end of the short hook $c'$ of the short bar C of the adjacent car to abut against, to prevent the cars from running against each other.

With this construction, when the cars are run together, the long hook $b^1$ of each car interlocks with the short hook $c'$ of the other car, forming a double connection, so that should one of the hooks $b^1$ $c'$ break, the other may hold the cars coupled. The hooks $b^1$ $c'$ are made deep, as shown in Fig. 1, so that cars of different heights may be coupled with the same facility as cars of the same height.

To the forward part of the bar B are attached the ends of a keeper, E, which passes around the end of the bar C, to prevent the said forward ends from being drawn or pushed too far apart. To the outer side of the forward end of the short bar C is connected the end of a bar, F, which passes through a guide-hole in a bar, G, attached to the body A of the car.

To the outer end of the sliding bar F is pivoted, by a link or other suitable means, the end of the lower arm of a bent or crank lever, H, which is pivoted to the car-body A, and the upper arm of which is above the said car-body, so that the lever H can be operated from the top of the car. With the outer end of the sliding bar F is also connected a second lever, H, the lower end of which projects into such a position that it may be operated from the side of the car. The second lever H is pivoted to the end of the car-body A, and with its upper end is connected, by a connecting-rod, I, the upper end of the third lever H, which is pivoted to the end of the car-body A in such a position that its lower end may be reached and operated from the other side of the car. With this arrangement the bar F can be drawn outward, drawing back the hook $c'$, and uncoupling the cars by a person upon the top or at either side of the car. The hook $c'$, when drawn back, is held in place by a pin, J, which passes down through a hole in the guide-bar G, and through a notch or hole in the sliding bar, F.

When the cars are coupled the lower end of the pin J rests upon the upper side of the sliding bar F. The pin J is held down by a spiral spring, K, placed upon its middle part, and the lower end of which rests upon a shoulder formed upon the said pin. The upper end of the spiral spring K rests against the lower end of a socket, L, through which the upper part of the pin J passes, and which is attached to the end of the car-body A.

With the upper end of the pin J are connected the inner ends of three levers, M, one of which is pivoted to the top and the other two to the end of the car-body A, so that the pin J may be raised from the top or either side of the car, to release the sliding bar F and allow the hook c' to be moved inward by the spring D into position to couple the cars when they are run together.

In the case of passenger-cars all the levers H M may be omitted except one lever, H, for drawing back the sliding bar F.

Having thus described my invention, I claim as new and desire to secure by Letters Patent—

1. The combination of the two hook-bars B C, pivoted to each other and provided with the spring D, the sliding bar F, one or more levers, H, the pin J, and the spiral spring K, with each other and the body A of a car, substantially as herein shown and described.

2. The combination of the two hook-bars B C, pivoted to each other and provided with the spring D, the sliding bar F, the three levers H, the pin J, the spiral spring K, and the three levers M, with each other and the body A of a car, substantially as herein shown and described.

JOHN TIMOTHY O'HARRA.

Witnesses:
   HECTOR BELL MCLEAN,
   THOMAS GOODMAN.